Nov. 15, 1955  W. F. MacGLASHAN, JR., ET AL  2,723,681
NORMALLY CLOSED SOLENOID-OPERATED VALVE
WITH DOWNSTREAM VENTING WHEN CLOSED
Filed May 12, 1952
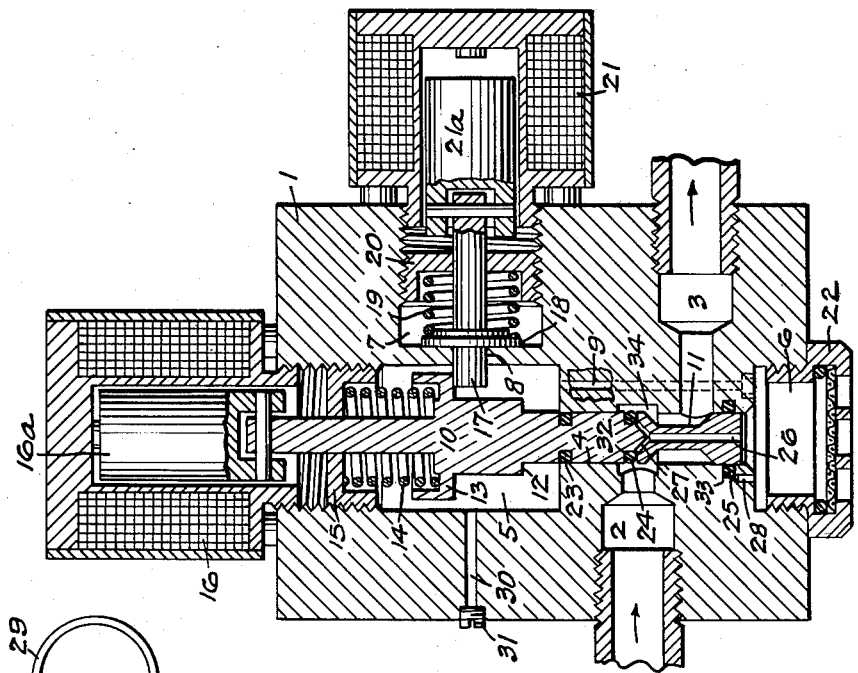
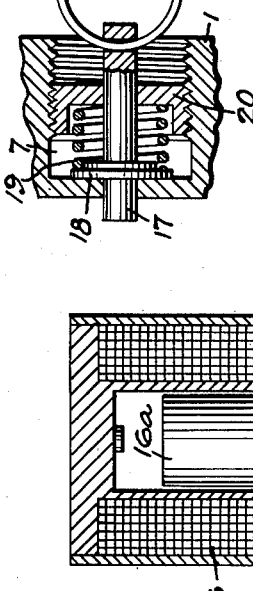
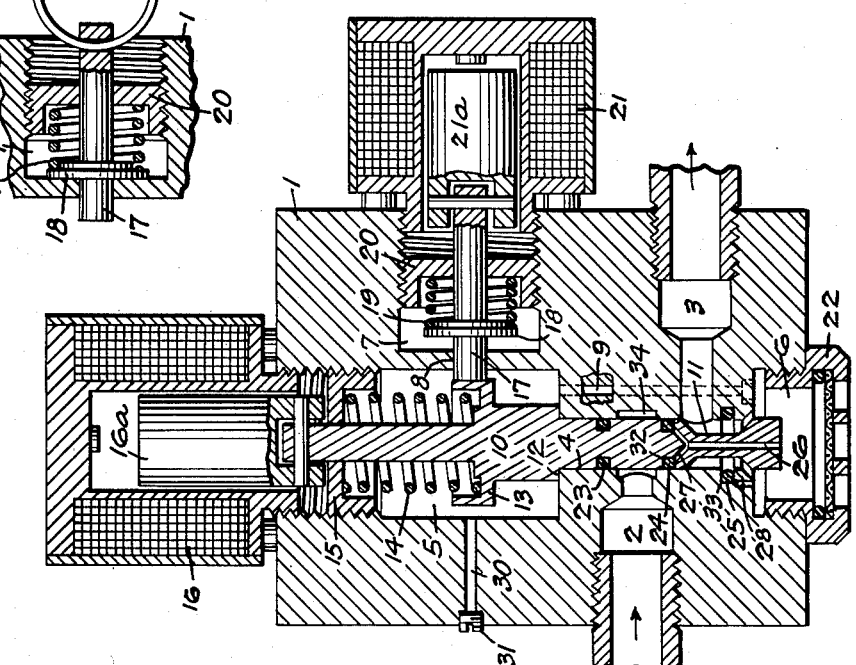
INVENTORS
William F. MacGlashan, Jr.
Harry J. Margraf
BY
ATTORNEYS United States Patent Office 2,723,681
Patented Nov. 15, 1955

2,723,681

NORMALLY CLOSED SOLENOID-OPERATED VALVE WITH DOWNSTREAM VENTING WHEN CLOSED

William F. MacGlashan, Jr., and Harry J. Margraf, Pasadena, Calif., assignors to the United States of America as represented by the Secretary of the Army Application May 12, 1952, Serial No. 287,306

3 Claims. (Cl. 137—625.25)

This invention relates to a solenoid-operated valve and the primary object of the invention is to provide a valve which operates satisfactorily under the severe conditions of extremely high pressure and abrupt halting of flow in the line.

Another object of the invention is to provide for venting downstream when the valve is closed so that residual flow may be minimized.

Still another object is to provide for satisfactory retention in place of sealing rings even under conditions of high pressure and velocity of the fluids passing through the valve.

Yet another object is to provide a valve of the general character above indicated which is adaptable for use with corrosive gases or liquids as well as air and other non-corrosive fluids.

A last object to be mentioned specifically is to provide a valve which is reasonably simple and practicable to manufacture, completely reliable, as well as sturdy and durable in use.

A preferred form of the invention is illustrated in the accompanying drawing, in which:

Figure 1 is a vertical sectional view of the assembled valve with the inlet and outlet pipes shown fragmentarily and the valve stem or pintle in inlet-closing, outlet-venting position;

Figure 2 is a similar view showing the valve pintle in position to allow full flow through the valve; and Figure 3 is a fragmentary view showing a modification of the valve wherein the unlatching solenoid is replaced by a simple finger ring.

Similar characters of reference indicate similar or identical elements and portions throughout the specification and the several views of the drawing.

Referring now to the drawing, in detail, the valve body 1 is pierced on opposite sides by the parallel and non-intersecting inlet bore 2 and outlet bore 3. Perpendicular to the inlet and outlet and intersecting them at their mesial ends, the pintle run 4 connects the inlet and outlet to form a continuous passage through the valve body. The inlet enters the pintle run above the outlet. Above the inlet, the pintle run enlarges to form the threaded pintle-spring chamber 5, extending through the top of the valve body. Below the outlet, the pintle run enlarges to form the threaded vent chamber 6, extending through the bottom of the valve body.

The threaded pintle-latch chamber or lateral counterbore 7 is parallel to the outlet and located directly above it. The pintle-latch chamber is open to the outside of the valve body and connects to the pintle-spring chamber through a narrow pintle-latch bearing or lateral bore 8. The pintle-spring chamber and the vent chamber are connected by a narrow bore 9 not connecting with any other chamber or bore.

The pintle 10 is a figure of revolution about its long axis, having a diameter equal to that of the pintle run through most of its length and extending through the pintle-spring chamber and the pintle run. Close to the lower end, the reduced diameter 11 allows fluid flow between the inlet and outlet in the pintle run when the pintle is elevated to the open position. The upper end is enlarged in diameter to form the lower pintle shoulder 12 that limits downward pintle travel against the lower end of the pintle-spring chamber. On the pintle above the lower shoulder 12, a further enlargement forms the upper pintle shoulder 13 that faces upward to receive thrust from the pintle spring 14. The pintle spring 14 is backed up by the pintle-spring collar 15 that threads into the pintle-spring chamber. The upper end of the pintle is attached to an electromagnet 16 that pulls the pintle up against the spring. The upper pintle shoulder 13 also faces downward to rest against the pintle latch 17 when the pintle is elevated in the open position.

The pintle latch extends through the pintle-latch chamber and far enough into the pintle-spring chamber to protrude under the shoulder 13 of the pintle. The pintle latch has a shoulder 18 in the pintle-latch chamber to receive thrust from the pintle-latch spring 19. This spring is, in turn, backed up by the pintle-latch spring collar 20 that is threaded into the pintle-latch chamber, distal to the spring and shoulder. The outside end of the pintle latch 17 is attached to an electromagnet 21 that pulls the pintle latch out against the spring. The vent chamber 6 is fitted with a screened screw cap 22 that protects the interior of the valve from foreign matter.

The valve is sealed by three O-rings made of rubber or similar material and seated in annular slots whose depth is such as to allow the rings to be forced against the opposing surfaces to obtain seal. The upper pintle ring 23 is contained in an annular slot in the pintle just below the lower shoulder and presses against the pintle run between the inlet and the pintle-spring chamber regardless of pintle position. The lower pintle ring 24 is in a similar annular slot just above the reduced diameter of the pintle, and its outer surface also seats against the pintle run. The lower pintle ring seats against the pintle run between the inlet and the outlet when the pintle is in the depressed closed position. This ring does not seat in the open position and is exposed in bore enlargement 34.

The pintle-run ring 25 is contained in an annular slot in the valve body, opening into the pintle run between the outlet 3 and the vent chamber 6. This ring 25 seals against the pintle when the pintle is elevated in the open position, but does not seal in the depressed closed position. The lower pintle ring slot is vented to atmosphere through a central bore 26 in the pintle, running between the slot 32 and the bottom end of the pintle. This central bore is connected to the slot 32 by a series of small bores 27 that radiate from the central bore to vent the slot 32 at the intersection of the lower wall with the inside wall. The pintle-run ring slot 33 is also vented to the atmosphere by a series of small bores 28 running directly down from the intersection of the lower wall with the inside wall of the slot 33 to the vent chamber.

In use, the valve may be opened by exciting the pintle electromagnet. The pintle is drawn up, and the inlet bore is opened to the outlet bore by flow around the small diameter section of the pintle. The pintle latch slips forward to hold the valve open after the pintle electromagnet is de-energized. The valve may then be closed by exciting the pintle-latch electromagnet. The pintle latch is drawn back to allow the pintle to slide down, closing off the inlet from the outlet by the blocking action of the large diameter section of the pintle. The small diameter section of the pintle simultaneously allows downstream venting from the outlet to the vent chamber.

Hydraulic balance of the pintle is maintained during downstream venting by the bore that connects the pintle-spring chamber to the vent chamber. This bore also vents any leakage past the upper pintle ring to maintain hydraulic balance at all times. During flow and venting, when the lower pintle ring respectively and pintle-race ring are exposed to the unseating influence of flow under extreme pressure, it is necessary to maintain a suitably limited counteracting pressure differential between the exposed and the protected surfaces of the rings. To maintain this differential, the protected surface of each ring is vented to atmosphere by connection to the vent chamber through the small bores. A restraining force is created by the differential pressure across the holes sufficient to retain the O-rings when fluid under pressure in the order of 2000 p. s. i. is blasted through the valve to atmosphere.

The valve is designed for solenoid unlatch, but it is susceptible of modification for manual unlatching by removing the solenoid 21 and substituting a wire finger ring 29, illustrated in Figure 3. It may also be used without the latch by removing latch plunger and plugging the opening.

Although this valve was designed for use with air, it would be readily converted for use with corrosive gases or liquids by closing the bore 9 which joins the pintle-spring chamber 5 and vent chamber and opening the bore 30, thus providing a pintle-spring chamber vent to atphosphere, and by piping away all vented fluid. This conversion is accomplished by removing the plug 31 from the end of bore 30 and inserting it in one end of the bore 9, but other means for accomplishing the above modification, as well as minor variations in the structure of the valve, may be resorted to without departure from the spirit and scope of this invention.

We claim:

1. A valve for use in a high pressure line comprising a valve body having a longitudinal axial bore forming a valve chamber, there being a first coaxial counterbore in communication with said axial bore at the lower end thereof forming a vent chamber, said axial bore having a second coaxial counterbore in communication therewith at its upper end to provide a spring receiving chamber and to form a shoulder at the junction thereof with said valve chamber, there being diametrically opposed and axially spaced bores in said valve body along said valve chamber providing an inlet and an outlet chamber each communicating at its inner end with said valve chamber at respective diametrical points, there also being a lateral bore and an outwardly extending third coaxial counterbore in said body above said outlet chamber and parallel thereto forming a latch chamber, said lateral bore communicating at its inner end with said second longitudinal axial counterbore and at its outer end with said latch chamber, an elongated valve stem reciprocable in said longitudinal axial bore and having a portion snugly engaging the wall thereof, there being a first elongated annular recess formed in the surface of said valve stem and extending axially thereof overlying the inner ends of said inlet and outlet chambers in valve-open position to direct fluid flow from inlet chamber to outlet chamber, and connecting the inner end of said outlet chamber and the upper end of said vent chamber for fluid flow when said valve is in closed position, there being a second annular recess in said valve stem axially spaced upwardly from said first annular recess and lying in the direct path of fluid flow when said valve stem is in valve-open position, an O-ring tightly received in said second annular recess in contact with the wall of said valve chamber between said inlet and outlet chambers to form a fluid seal when said valve stem is in closed valve position, there being a plurality of radially disposed conduits in said valve stem opening at their outer ends in said second annular recess and an axial conduit in said valve stem connected at its upper end to the inner ends of said radially disposed conduits and extending downwardly to the lower end of said valve stem venting said second annular recess into said vent chamber, the upper end of said valve stem extending into said second counterbore and being diametrically enlarged to form a stop shoulder for engagement with said shoulder formed at the junction of said spring receiving chamber and said valve chamber when said valve stem is in valve-closed position, a keeper fixed with said valve stem enlargement adjacent said lateral bore in said body, means in said body and connected to the upper end of said valve stem for moving said valve stem to valve-open position, resilient means in said spring chamber biasing said valve stem to valve-closed position, a latch reciprocable in said lateral bore and into said second counterbore to engage under said keeper on said valve stem enlargement to releasably lock said valve stem in open position, means resiliently biasing said latch into valve stem locking-position, and means to withdraw said latch against the bias of said last named resilient means, there being a longitudinal bore eccentrically disposed in said body and providing communication between said vent chamber and said spring receiving chamber.

2. The valve of claim 1, wherein said means to move said valve stem to valve opening position is a solenoid.

3. The valve of claim 1, wherein said means to withdraw said latch is a solenoid.

References Cited in the file of this patent

UNITED STATES PATENTS

| | | |
|---|---|---|
| 731,633 | Trout | June 23, 1903 |
| 775,054 | Waterman | Nov. 15, 1904 |
| 959,609 | Roehrich | May 31, 1910 |
| 1,787,212 | Rickenberg | Dec. 30, 1930 |
| 2,460,633 | Franck | Feb. 1, 1949 |
| 2,481,482 | Green | Sept. 13, 1949 |
| 2,506,111 | Saint | May 2, 1950 |
| 2,524,142 | Seeloff | Oct. 3, 1950 |

FOREIGN PATENTS

| | | |
|---|---|---|
| 662,448 | Great Britain | Dec. 5, 1951 |